United States Patent
Hess

(10) Patent No.: US 12,277,620 B2
(45) Date of Patent: Apr. 15, 2025

(54) METHOD FOR IDENTIFYING A MOTOR VEHICLE

(71) Applicant: Robert Bosch GmbH, Stuttgart (DE)

(72) Inventor: Felix Hess, Benningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/633,789

(22) Filed: Apr. 12, 2024

(65) Prior Publication Data
US 2024/0386514 A1 Nov. 21, 2024

(30) Foreign Application Priority Data
May 16, 2023 (DE) .................. 10 2023 204 561.3

(51) Int. Cl.
G06Q 50/40 (2024.01)
H04L 9/08 (2006.01)

(52) U.S. Cl.
CPC ........... *G06Q 50/40* (2024.01); *H04L 9/0841* (2013.01); *G06Q 2240/00* (2013.01)

(58) Field of Classification Search
CPC .............................. G06Q 10/02; G06Q 50/40
See application file for complete search history.

(56) References Cited

U.S. PATENT DOCUMENTS 8,869,448 B1 * 10/2014 Lee .................. E05F 15/74 49/13
2020/0198620 A1 * 6/2020 Nakata .............. B60W 60/0053

FOREIGN PATENT DOCUMENTS

| DE | 102016200794 A1 | 7/2017 | |
|---|---|---|---|
| DE | 102016213145 A1 | 1/2018 | |
| DE | 102017204916 A1 * | 9/2018 | ............ B60R 25/20 |
| DE | 102018115851 A1 | 1/2020 | |
| EP | 3278530 B1 | 7/2020 | |

(Continued)

OTHER PUBLICATIONS

Ni, Jianbing, Xiaodong Lin, and Xuemin Shen. ("Toward privacy-preserving valet parking in autonomous driving era." IEEE Transactions on Vehicular Technology 68.3 (2019): 2893-2905 (Year: 2019).*

(Continued)

*Primary Examiner* — Emmett K. Walsh
(74) *Attorney, Agent, or Firm* — NORTON ROSE FULBRIGHT US LLP; Gerard A. Messina

(57) ABSTRACT

A method for identifying a motor vehicle, in particular AVP motor vehicle. The method includes: agreeing on a common secret by an infrastructure-side system, in particular AVP system, of an infrastructure, in particular of a parking lot, with a motor-vehicle-side system, in particular AVP system, of the motor vehicle; ascertaining a first code on the basis of the common secret using a predetermined ascertainment rule by means of the infrastructure-side system; detecting a signal which was emitted from a motor vehicle located within the infrastructure and transmits a second code, by means of the infrastructure-side system; comparing the second code to the first code by means of the infrastructure-side system in order to identify the motor vehicle emitting the signal as the one motor vehicle with the motor-vehicle-side system of which the common secret has been agreed.

14 Claims, 3 Drawing Sheets

(56) References Cited

FOREIGN PATENT DOCUMENTS

EP 3882733 A1 9/2021
KR 20200144616 A * 10/2020 ............ B60W 30/06

OTHER PUBLICATIONS

Xie, Jun, Zhaocheng He, and Yiting Zhu. "A DRL based cooperative approach for parking space allocation in an automated valet parking system." Applied Intelligence 53.5 (2023): 5368-5387. (Year: 2022).*
International Standard, ISO 23374-1, "Intelligent Transport Systems—Automated Valet Parking Systems (AVPS)," 2023, pp. 1-15. <https://cdn.standards.iteh.ai/samples/78420/b1c8e9d1b2c94dfdbc27d2a0efd8b601/ISO-23374-1-2023.pdf> Downloaded Apr. 10, 2024.

* cited by examiner

METHOD FOR IDENTIFYING A MOTOR VEHICLE

CROSS REFERENCE

The present application claims the benefit under 35 U.S.C. § 119 of German Patent Application No. DE 10 2023 204 561.3 filed on May 16, 2023, which is expressly incorporated herein by reference in its entirety.

FIELD

The present invention relates to a method for identifying a motor vehicle, to a system for an infrastructure, to a method for motor-vehicle-side support of an infrastructure-side identification of a motor vehicle, to a system for a motor vehicle, to a motor vehicle, a computer program, and a machine-readable storage medium.

BACKGROUND INFORMATION

In automated valet parking (AVP), motor vehicles are driven in a driverless manner within a parking lot. In this case, an infrastructure installed in the parking lot monitors the environment of the motor vehicle in order to guide the motor vehicle without collision and at a sufficient distance from other road users within the parking lot. In this case, it must be ensured that, before starting to drive the motor vehicle in a driverless manner, the position of the motor vehicle to be guided can be unambiguously determined within the parking lot. For such a position determination, the motor vehicle must be unambiguously identified.

German Patent Application No. DE 10 2016 213 145 A1 describes a method for authenticating a motor vehicle.

SUMMARY

An object of the present invention is to makes it possible that a motor vehicle can be efficiently identified or that a motor vehicle is efficiently identified.

This object may be achieved by means of features of the present invention. Advantageous embodiments of the present invention are disclosed herein.

According to a first aspect of the present invention, a method for identifying a motor vehicle, in particular AVP motor vehicle, is provided. According to an example embodiment of the present invention, the method includes the following steps:

agreeing on a common secret by an infrastructure-side system, in particular AVP system, of an infrastructure, in particular of a parking lot, with a motor-vehicle-side system, in particular AVP system, of the motor vehicle;
ascertaining a first code on the basis of the common secret using a predetermined ascertainment rule by means of the infrastructure-side system;
detecting a signal which was emitted from a motor vehicle located within the infrastructure and transmits a second code, by means of the infrastructure-side system;
comparing the second code to the first code by means of the infrastructure-side system in order to identify the motor vehicle emitting the signal as the one motor vehicle with the motor-vehicle-side system of which the common secret has been agreed.

According to a second aspect of the present invention, a system, in particular AVP system, for an infrastructure, in particular a parking lot, is provided, which is configured to perform all steps of the method according to the first aspect.

According to a third aspect of the present invention, a method for motor-vehicle-side support of an infrastructure-side identification of a motor vehicle, in particular AVP motor vehicle, is provided. According to an example embodiment of the present invention, the method includes the following steps:

agreeing on a common secret by a motor-vehicle-side system, in particular AVP system, of the motor vehicle with an infrastructure-side system, in particular AVP system, of an infrastructure, in particular of a parking lot;
ascertaining a code on the basis of the common secret using a predetermined ascertainment rule by means of the motor-vehicle-side system;
operating the motor vehicle by means of the motor-vehicle-side system in such a way that the motor vehicle emits a signal transmitting the ascertained code.

According to a fourth aspect of the present invention, a system, in particular AVP system, is provided for a motor vehicle, wherein the system is configured to perform all steps of the method according to the third aspect.

According to a fifth aspect of the present invention, a motor vehicle is provided, which comprises the system according to the fourth aspect.

According to a sixth aspect of the present invention, a computer program is provided, which comprises commands that, when the computer program is executed by a computer, for example by the system according to the second aspect and/or according to the fourth aspect, causes the computer to perform a method according to the first aspect and/or according to the third aspect.

According to a seventh aspect of the present invention, a machine-readable storage medium is provided, on which the computer program according to the sixth aspect is stored.

The present invention is based on and includes the finding that a common secret is agreed between the motor-vehicle-side system and the infrastructure-side system, for example a common cryptographic key by using a key exchange method.

Furthermore, according to an example embodiment of the present invention disclosed herein, it is provided that both the infrastructure-side system and the motor-vehicle-side system each ascertain a code on the basis of the agreed secret. In this case, the infrastructure-side system and the motor-vehicle-side system use the same predetermined ascertainment rule. The ascertained codes will thus be identical.

The motor-vehicle-side system subsequently operates the motor vehicle in such a way that the motor vehicle emits a signal transmitting the ascertained code.

On the side of the infrastructure system, this signal is detected, wherein, at the time of detection, the infrastructure-side system does not yet have to know that the motor vehicle emitting the signal is the one motor vehicle with the motor-vehicle-side system of which the infrastructure-side system has previously agreed the common secret. On the side of the infrastructure-side system, it is then provided that the code, which, by the signal emitted by the motor vehicle, is compared to the code which the infrastructure-side system itself has previously ascertained. On the basis of this comparison, the motor vehicle emitting the signal is identified as the one motor vehicle.

This in particular brings about the technical advantage that the infrastructure-side system can efficiently identify the motor vehicle. This in particular brings about the technical advantage that the motor-vehicle-side system can efficiently support the infrastructure-side system in an infrastructure-side identification of the motor vehicle.

This in particular brings about the technical advantage that, for example, an AVP motor vehicle can be efficiently identified within the scope of an AVP process.

In one embodiment of the method according to the first aspect of the present invention, it is provided that agreeing on the common secret comprises the infrastructure-side system sending the common secret in encrypted form to the motor-vehicle-side system or the infrastructure-side system receiving the common secret in encrypted form from the motor-vehicle-side system.

This, for example, brings about the technical advantage that the secret can be agreed efficiently. The encryption, in particular, brings about the technical advantage that it is made more difficult or impossible for third parties to listen in on the common secret.

In one embodiment of the method according to the first aspect of the present invention, it is provided that a random number is ascertained as the common secret by the infrastructure-side system and is sent in encrypted form by the infrastructure-side system to the motor-vehicle-side system.

This, for example, brings about the technical advantage that the common secret can be ascertained and agreed efficiently.

In one embodiment of the method according to the first aspect of the present invention, it is provided that the common secret is agreed by means of a key exchange method so that the common secret is a common cryptographic key.

Using a key exchange method, for example, brings about the technical advantage that, even if a communication between the motor-vehicle-side system and the infrastructure-side system is read by third parties, it is not possible to deduce the common cryptographic key by reading the communication. The common secret can thus also be agreed efficiently via a communication channel which is not tap-proof, i.e., for example, is not encrypted. Thus, for example, a communication between the motor-vehicle-side system and the infrastructure-side system can be an unencrypted communication so that a computing effort necessary for the encryption can be saved on both sides due to the non-encryption.

In one embodiment of the method according to the first aspect of the present invention, it is provided that, in the event of a positive identification, the motor vehicle is located by the infrastructure-side system.

This, for example, brings about the technical advantage that an instantaneous position of the motor vehicle can be determined efficiently. Locating comprises, for example, that the motor vehicle is located within a digital map of the infrastructure, in particular of the parking lot.

A positive identification means that the second code corresponds to the first code, in particular corresponds within a predetermined tolerance range.

In one embodiment of the method according to the first aspect of the present invention, it is provided that, in the event of a positive identification, a position of a signal source emitting the signal is ascertained by the infrastructure-side system, wherein the motor vehicle is located by the infrastructure-side system on the basis of the ascertained position of the signal source.

This, for example, brings about the technical advantage that the motor vehicle can be located efficiently.

Locating is, for example, locating within the infrastructure.

In one embodiment of the method according to the first aspect of the present invention, it is provided that the common secret, in particular the common cryptographic key or the random number, is agreed using a broadcast communication method, in particular a V2X protocol.

This, for example, brings about the technical advantage that the common secret can be agreed efficiently. In particular, the use of a V2X protocol has the technical advantage that a standardized protocol is used for the communication between infrastructure-side system and motor-vehicle-side system.

In one embodiment of the method according to the first aspect of the present invention, it is provided that the predetermined ascertainment rule is specified to the motor-vehicle-side system by the infrastructure-side system or is received by the infrastructure-side system from the motor-vehicle-side system.

This, for example, brings about the technical advantage that the predetermined ascertainment rule can be specified efficiently. This, in particular, by the infrastructure-side AVP system or by the motor-vehicle-side AVP system. This thus, in particular, means that the predetermined ascertainment rule is defined, for example, by the motor-vehicle-side AVP system or by the infrastructure-side AVP system.

In one embodiment of the method according to the first aspect of the present invention, it is provided that the predetermined ascertainment rule is selected from the following group of ascertainment rules: ascertaining the first code by a hash function that is applied to the common secret, in particular to the cryptographic key or the random number; using a group or a subset of bits from the common secret, in particular from the cryptographic key or from the random number, or a hash value of the common secret, in particular of the cryptographic key or the random number.

The ascertainment rule is, for example, predetermined or standardized, i.e., defined in advance. For example, the ascertainment rule comprises: a calculation of an, in particular 32-bit, hash value or a checksum from the common secret, in particular from the cryptographic key or from the random number. Subsequently, for example, the first n bits of the hash value are output as an optical signal via a motor vehicle lighting system of the motor vehicle, for example via one or more flashing lights of a driving direction indicator of the motor vehicle. The infrastructure, i.e., the infrastructure-side system, informs the motor-vehicle-side system, for example, of the number of bits, for example the first 8 or the first 20 bits, that are output as an optical signal, in particular as flashing signals via the flashing light or the flashing lights.

Further examples of ascertainment rules: uses the first 8 bits from a 64-bit secret, in particular from the cryptographic key or from the random number. Or use the bits 13 14 16 19 23 42 47 and 63 from the secret, in particular from the cryptographic key or from the random number. Or use the last 8 bits of the secret, in particular of the cryptographic key or the random number. Instead of 8 bits, a different/greater number is provided, for example. Thus, for example, 12 bits or 20 bits, etc. Or: calculate a 32-bit hash value from a 64-bit secret, in particular from the cryptographic key or from the random number. Select a predetermined subset of bits as a code from the hash value.

In one embodiment of the method according to the first aspect of the present invention, it is provided that the common cryptographic key is agreed by means of a Diffie-Hellman (DH) method or an elliptic curve Diffie-Hellman (ECDH) method.

This, for example, brings about the technical advantage that a particularly suitable key exchange method is used.

In one embodiment of the method according to the third aspect of the present invention, it is provided that the motor vehicle is operated by the motor-vehicle-side system in such a way that the motor vehicle emits an optical signal, which transmits the ascertained code, using a motor vehicle lighting system, in particular one or more flashing lights of a driving direction indicator, of the motor vehicle.

This, for example, brings about the technical advantage that the code can be transmitted efficiently to the infrastructure-side AVP system.

A motor vehicle lighting system comprises, for example, one or more of the following elements from the group of motor vehicle lights: low beam light, high beam light, brake light, reversing light, parking light, driving direction indicator, fog light.

In one embodiment of the method according to the third aspect of the present invention, it is provided that agreeing on the common secret comprises the motor-vehicle-side system sending the common secret in encrypted form to the infrastructure-side system or the motor-vehicle-side system receiving the common secret in encrypted form from the infrastructure-side system.

This, for example, brings about the technical advantage that the secret can be agreed efficiently. The encryption, in particular, brings about the technical advantage that it is made more difficult or impossible for third parties to listen in on the common secret.

In one embodiment of the method according to the third aspect of the present invention, it is provided that a random number is ascertained as the common secret by the motor-vehicle-side system and is sent in encrypted form by the motor-vehicle-side system to the infrastructure-side system.

This, for example, brings about the technical advantage that the common secret can be ascertained and agreed efficiently.

In one embodiment of the method according to the third aspect of the present invention, it is provided that the common secret is agreed by means of a key exchange method so that the common secret is a common cryptographic key.

In one embodiment of the method according to the third aspect of the present invention, it is provided that the common secret, in particular the common cryptographic key or the random number, is agreed using a broadcast communication method, in particular a V2X protocol.

In one embodiment of the method according to the third aspect of the present invention, it is provided that the predetermined ascertainment rule is specified to the motor-vehicle-side system by the infrastructure-side system or is received by the infrastructure-side system from the motor-vehicle-side system.

In one embodiment of the method according to the third aspect of the present invention, it is provided that the predetermined ascertainment rule is selected from the following group of ascertainment rules: ascertaining the first code by a hash function that is applied to the common secret, in particular to the cryptographic key or the random number; using a group or a subset of bits from the common secret, in particular from the cryptographic key or from the random number, or a hash value of the common secret, in particular of the cryptographic key or the random number.

In one embodiment of the method according to the third aspect of the present invention, it is provided that the common cryptographic key is agreed by means of a Diffie-Hellman (DH) method or an elliptic curve Diffie-Hellman (ECDH) method.

Statements made in connection with the method according to the first aspect apply analogously to the method according to the third aspect, and vice versa. Technical functionalities of the method according to the first aspect result analogously from corresponding technical functionalities of the method according to the third aspect, and vice versa. This means that features of the method according to the first aspect result analogously from corresponding features of the method according to the third aspect, and vice versa.

The system according to the second aspect of the present invention is, for example, configured in terms of programming to execute a computer program which comprises commands that, when the computer program is executed by a computer, cause the computer to perform a method according to the first aspect.

For example, the system according to the fourth aspect of the present invention is configured in terms of programming to execute a computer program which comprises commands that, when the computer program is executed by a computer, cause the computer to perform a method according to the third aspect.

The method according to the first aspect of the present invention is, for example, a computer-implemented method.

The method according to the third aspect of the present invention is, for example, a computer-implemented method.

Statements made in connection with the method according to the first aspect apply analogously to the system according to the second aspect, and vice versa. This means that technical functionalities and technical features of the system according to the second aspect result analogously from corresponding technical functionalities and technical features of the method according to the first aspect, and vice versa.

Statements made in connection with the method according to the third aspect apply analogously to the system according to the fourth aspect, and vice versa. This means that technical functionalities and technical features of the system according to the fourth aspect result analogously from corresponding technical functionalities and technical features of the method according to the third aspect, and vice versa.

A system within the meaning of the description is, for example, an AVP system, i.e., in particular a motor-vehicle-side AVP system or an infrastructure-side AVP system.

A motor vehicle within the meaning of the description is, for example, an AVP motor vehicle.

A motor vehicle within the meaning of the description is located within the infrastructure.

An infrastructure within the meaning of the description comprises, for example, or is, for example: parking lot, railroad station, loading station, harbor, lading port, car terminal, ferry dock, factory, motor vehicle factory, motor vehicle plant.

A motor vehicle within the meaning of the description is, for example, an at least highly automated motor vehicle. This means that the motor vehicle is in particular configured to drive in an at least highly automated manner.

The system for a motor vehicle is, for example, configured to guide a motor vehicle in an at least highly automated manner.

The abbreviation AVP stands for "automated valet parking." An AVP process comprises, for example, an at least highly automated guidance of the AVP motor vehicle from a drop zone, also called a drop-off position, to a parking position and, for example, an at least highly automated guidance of the AVP motor vehicle from a parking position to a pick-up position, also called a pickup zone. At the drop-off position, i.e., the drop zone, a driver of the AVP motor vehicle drops off the AVP motor vehicle for an AVP process. At a pick-up position, i.e., the pickup zone, the AVP motor vehicle is picked up after an end of the AVP process. An AVP process thus starts in particular at the drop zone. An AVP process thus ends in particular at the pickup zone. The pickup zone can be the same as or different from the drop zone.

An AVP motor vehicle is thus a motor vehicle which can participate in an AVP process.

The AVP process is carried out on the part of the infrastructure using the or by an exemplary AVP system according to the second aspect and is carried out on the part of the AVP motor vehicle using the or by an exemplary AVP system according to the fourth aspect.

An AVP process can be an AVP process according to one of the following AVP types: AVP type 1, AVP type 2 and AVP type 3. However, the AVP types can also change within an AVP process. This means, for example, that a portion of an AVP process is carried out according to AVP type 1 and a further portion of the AVP process is carried out according to an AVP type 2 or AVP type 3. This means, for example, that an AVP process can be subdivided into AVP subprocesses, which are each carried out according to one of the AVP types 1, 2 and 3.

AVP type 1 denotes a motor-vehicle-centered AVP process. The main responsibility for the AVP process lies with the AVP motor vehicle, i.e., with the motor-vehicle-side AVP system.

AVP type 2 denotes an infrastructure-centered AVP process. The main responsibility for the AVP process lies with the infrastructure, i.e., with the infrastructure-side AVP system. AVP type 3 denotes a shared motor vehicle/infrastructure AVP process. Here, a main responsibility for the AVP process is divided between the AVP motor vehicle, i.e., the motor-vehicle-side AVP system, and the infrastructure-side AVP system.

An AVP process comprises the following operations or functions:

1. Determining a target position, which is located within the parking lot, for the AVP motor vehicle.
2. Planning a route from a start position, which is comprised by the parking lot, to the target position.
3. Detecting an object and/or an event and responding accordingly to a detected object and/or a detected event.
4. Locating the AVP motor vehicle within the parking lot.
5. Calculating a desired trajectory for the AVP motor vehicle on the basis of the planned route.
6. Controlling a lateral and longitudinal guidance of the AVP motor vehicle on the basis of the calculated desired trajectory.

An assignment as to which of these operations or functions are carried out, depending on the AVP type, by the AVP motor vehicle, i.e., by the motor-vehicle-side AVP system, or by the infrastructure-side AVP system is indicated in the following table, wherein "I" stands for "infrastructure," i.e., for the infrastructure-side AVP system, and "K" stands for "AVP motor vehicle" so that "I" indicates that the process is carried out by the AVP system, and "K" indicates that the process is carried out by the motor-vehicle-side AVP system:

| Functions | AVP type 1 | AVP type 2 | AVP type 3 |
| --- | --- | --- | --- |
| Determining a target position, which is located within the parking lot, for the AVP motor vehicle. | I & K | I | I |
| Planning a route from a start position, which is comprised by the parking lot, to the target position. | K | I | I |
| Detecting an object and/or an event and responding accordingly to a detected object and/or a detected event. | K (& optionally I) | I | I & K |
| Locating the AVP motor vehicle within the parking lot. | K | I | K |
| Calculating a desired trajectory for the AVP motor vehicle on the basis of the planned route. | K | I | K |
| Controlling a lateral and longitudinal guidance of the AVP motor vehicle on the basis of the calculated desired trajectory. | K | K | K |

The table above thus indicates specifically for each AVP type for each function whether the function is carried out by the infrastructure, i.e., by the infrastructure-side AVP system, or by the AVP motor vehicle, i.e., by the motor-vehicle-side AVP system. In some cases, it can be provided that the function is performed by both the infrastructure-side AVP system and by the AVP motor vehicle.

With regard to object detection and event detection for AVP type 1, it may optionally be provided that, in addition to the motor-vehicle-side AVP system, the infrastructure-side AVP system also performs this function.

The AVP types 1, 2, and 3 described here are also described in detail in ISO standard 23374-1:2021 (E).

The AVP motor vehicle is an at least highly automated motor vehicle. Such a motor vehicle is configured for at least highly automated guidance. Highly automated guidance corresponds to a level of automation 4 according to the definition of the Federal Highway Research Institute (BASt).

The fact that the motor vehicle, in particular AVP motor vehicle, is configured at least for highly automated guidance includes both the case that the motor vehicle is configured for highly automated guidance and for fully automated guidance. Fully automated guidance corresponds to a level of automation 5 according to the definition of the BASt.

Highly automated guidance means that for a certain period of time in a specific situation (for example: driving on a freeway, driving within a parking lot, overtaking an object, driving within a lane defined by lane markings), a longitudinal and a lateral guidance of the motor vehicle are automatically controlled. A driver of the vehicle does not have to manually control the longitudinal and lateral guidance of the motor vehicle. The driver does not have to continuously monitor the automatic control of the longitudinal and lateral guidance in order to be able to intervene manually if necessary. If required, a prompt to take over the control of the longitudinal and lateral guidance is automatically output to the driver, in particular output with a sufficient time reserve. The driver therefore potentially has to be able to take over the control of the longitudinal and lateral guidance. Limitations of the automatic control of the lateral and longitudinal guidance are automatically detected. In highly automated guidance, it is not possible to bring about a state of minimal risk automatically in every starting situation.

Fully automated guidance means that in a specific situation (for example: driving on a freeway, driving within a parking lot, overtaking an object, driving within a lane defined by lane markings), a longitudinal and a lateral guidance of the motor vehicle are automatically controlled. A driver of the vehicle does not have to manually control the longitudinal and lateral guidance of the motor vehicle. The driver does not have to monitor the automatic control of the longitudinal and lateral guidance in order to be able to intervene manually if necessary. Before the automatic control of the lateral and longitudinal guidance is terminated, the driver is automatically prompted to take over the driving task (controlling the lateral and longitudinal guidance of the motor vehicle), in particular with a sufficient time reserve. If the driver does not take over the driving task, a return to a state of minimal risk is automatically made. Limitations of the automatic control of the lateral and longitudinal guidance are automatically detected. In all situations, it is possible to return to a system state of minimal risk automatically.

The motor vehicle comprises, for example, one or more environmental sensors. Such environmental sensors can also be called motor vehicle environmental sensors. Such environmental sensors are, for example, comprised by the motor-vehicle-side system. A motor vehicle environmental sensor system comprises, for example, one or more such environmental sensors.

The system according to the second aspect comprises, for example, one or more environmental sensors which are arranged spatially distributed within the infrastructure, in particular within the parking lot. Such environmental sensors can, for example, be referred to as infrastructure environmental sensors.

An infrastructure environmental sensor system comprises, for example, one or more such infrastructure environmental sensors.

An environmental sensor, i.e., a motor vehicle environmental sensor or an infrastructure environmental sensor, is, for example, one of the following environmental sensors: radar sensor, lidar sensor, image sensor, in particular image sensor of a video camera, for example image sensors of a stereo video camera, ultrasonic sensor, magnetic field sensor, infrared sensor.

The embodiments and exemplary embodiments described here can be combined with one another in any way even if this is not explicitly described.

The system according to the second aspect of the present invention can be referred to as an infrastructure-side system if it is implemented in an infrastructure, in particular a parking lot.

The system according to the fourth aspect of the present invention can be referred to as a motor-vehicle-side system if it is implemented in a motor vehicle.

The Diffie-Hellmann method in particular needs 2 parameters that can be defined in advance and may be publicly known. These parameters can, for example, be agreed in advance or described in a standard.

The parameters are: a large suitable prime number p and a so-called generator g. Suitable parameters for the Diffie-Hellmann method with 32-bit numbers are, for example:

$p=4294967087=2^{32}-209=0x\text{fffff2f}$ and $g=5$ or $g=10$.

Suitable parameters for the Diffie-Hellmann method with 64-bit numbers are, for example:

$p=18446744073709550147=2^{64}-1469=0x\text{fffffffffffffa43}$ and $g=2$ or $g=5$.

^ stands for exponentiation, i.e., 2 to the power of 32 or 2 to the power of 64.

The parameters indicated are in this case the relevant largest suitable prime number that can still be represented with the indicated number of bits, and 2 possible suitable generators. A prime number p is suitable if $(p-1)/2$ is also a prime number. This generally means that, for an n-bit secret, the parameter p is, for example, the relevant largest prime number that can still be represented with the indicated number of bits, here n bits, and that fulfills this property.

The present invention is explained in more detail below using preferred exemplary embodiments.

In the following, the same reference signs can be used for identical features.

DETAILED DESCRIPTION OF EXAMPLE EMBODIMENTS

Figure 1:
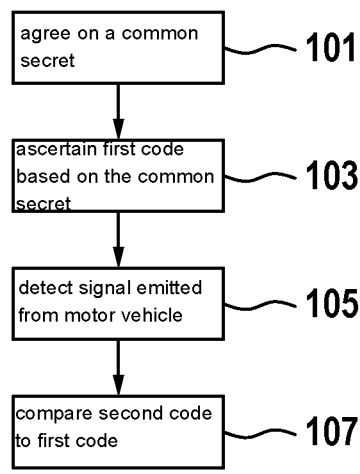
FIG. 1 shows a flow chart of an example method according to the first aspect of the present invention.

FIG. 1 shows a flow chart of a method for identifying a motor vehicle, in particular AVP motor vehicle, comprising the following steps:

agreeing 101 on a common secret by an infrastructure-side system, in particular AVP system, of an infrastructure, in particular of a parking lot, with a motor-vehicle-side system, in particular AVP system, of the motor vehicle;

ascertaining 103 a first code on the basis of the common secret using a predetermined ascertainment rule by means of the infrastructure-side system;

detecting 105 a signal which was emitted from a motor vehicle located within the infrastructure and transmits a second code, by means of the infrastructure-side system;

comparing 107 the second code to the first code by means of the infrastructure-side system in order to identify the motor vehicle emitting the signal as the one motor vehicle with the motor-vehicle-side system of which the common secret has been agreed.

Detecting 105 is, for example, carried out using one or more infrastructure environmental sensors.

Figure 2:
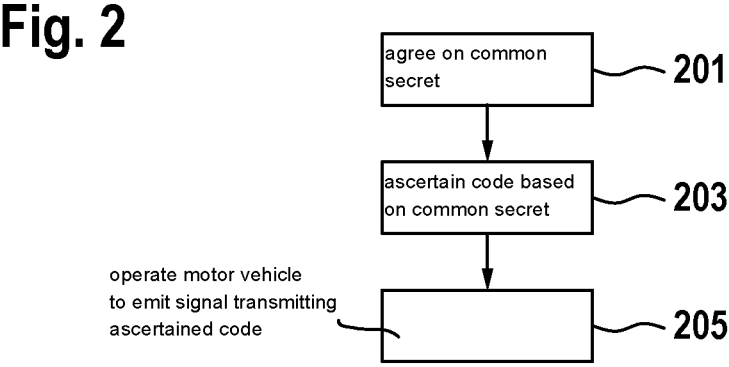
FIG. 2 shows a flow chart of an example method according to the third aspect of the present invention.

FIG. 2 shows a flow chart of a method for motor-vehicle-side support of an infrastructure-side identification of a motor vehicle, in particular AVP motor vehicle, is provided, comprising the following steps:

agreeing 201 on a common secret by a motor-vehicle-side system, in particular AVP system, of the motor vehicle with an infrastructure-side system, in particular AVP system, of an infrastructure, in particular of a parking lot;

ascertaining 203 a code on the basis of the common secret using a predetermined ascertainment rule by means of the motor-vehicle-side system;

operating 205 the motor vehicle by means of the motor-vehicle-side system in such a way that the motor vehicle emits a signal transmitting the ascertained code.

Figure 3:
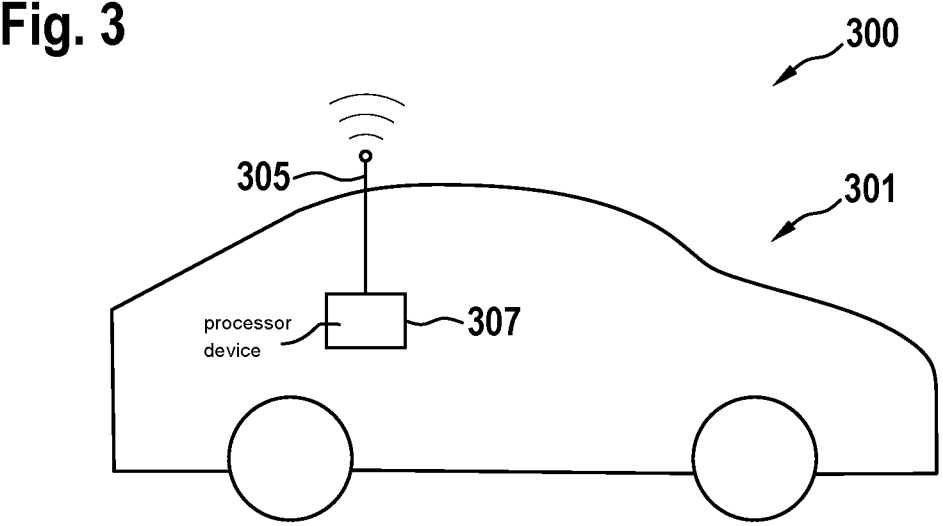
FIG. 3 shows an example system according to the fourth aspect of the present invention.

FIG. 3 shows a system 300 according to the fourth aspect, which is comprised by a motor vehicle 301 according to the fifth aspect or is implemented therein. The system 300 is configured to perform all steps of the method according to the third aspect.

The motor-vehicle-side system 300 comprises a wireless communication interface 305, which is configured to communicate with an infrastructure-side system (not shown).

Communicating within the meaning of the description comprises sending and receiving.

The system 300 furthermore comprises a processor device 307 comprising one or more processors (not shown). The processor device 307 is, for example, configured to carry out the calculation steps necessary for ascertaining the common secret.

Figure 4:
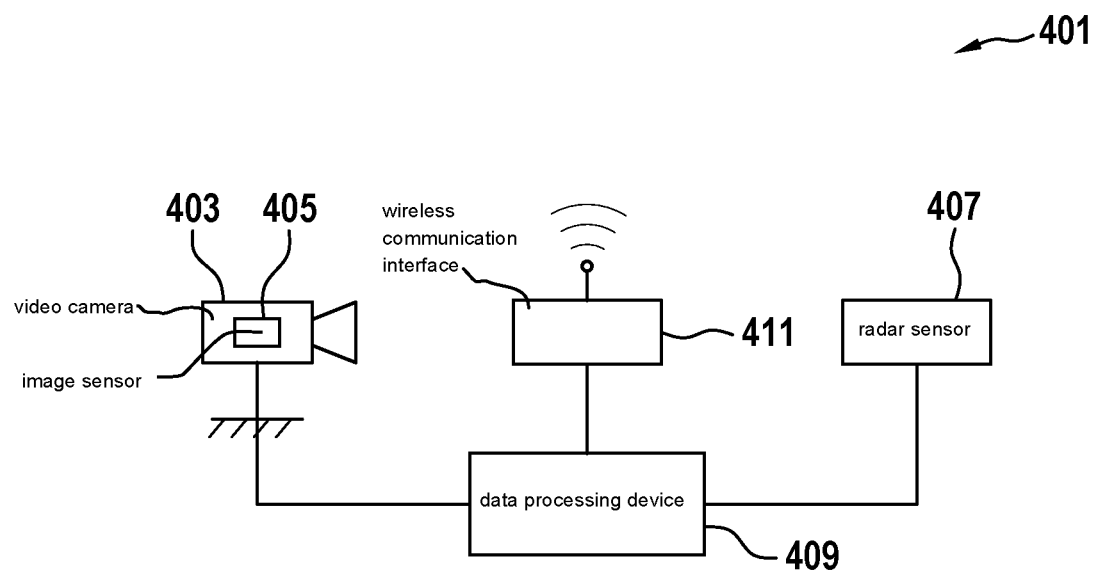
FIG. 4 shows an example system according to the second aspect of the present invention.

FIG. 4 shows a system 401 according to the second aspect. The system 401 is configured to perform all steps of the method according to the first aspect.

By way of example, the system 401 comprises a video camera 403 comprising an image sensor 405. By way of example, the system 401 comprises a radar sensor 407.

These environmental sensors are arranged spatially distributed within an infrastructure, in particular a parking lot (not shown), and in each case detect a region of the infrastructure. Environmental sensor data of these environmental sensors that are based on the detection are output to a data processing device 409, which processes the environmental sensor data and ascertains, for example, on the basis of the processing, for example, infrastructure assistance data for assisting an at least highly automated motor vehicle within the scope of an at least highly automated driving within the infrastructure, in particular within the scope of an AVP process.

At this point it is noted that more or fewer and/or other environmental sensors can be provided instead of or in addition to the environmental sensors shown in FIG. 4.

Furthermore, the infrastructure-side system 401 comprises a wireless communication interface 411, which is configured to communicate with one or more at least highly automated motor vehicles which are located within the infrastructure, in particular within the parking lot.

For example, the system 401 comprises a plurality of such wireless communication interfaces 411, which are arranged spatially distributed within the infrastructure in order to achieve sufficient radio coverage.

The data processing device 409 can, for example, comprise one or more servers, of which one or more can be implemented in a cloud infrastructure, for example.

In an embodiment (not shown), it is provided that the system 401 does not comprise any infrastructure environmental sensors. In this case, the infrastructure environmental sensors are already part of the infrastructure.

Figure 5:
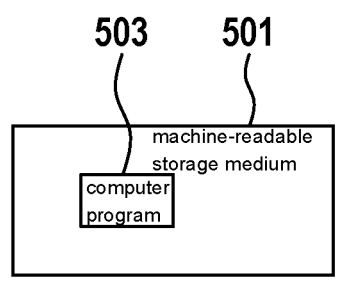
FIG. 5 shows an example machine-readable storage medium according to the seventh aspect of the present invention.

FIG. 5 shows a machine-readable storage medium 501 according to the seventh aspect, on which a computer program 503 according to the sixth aspect is stored.

Figure 6:
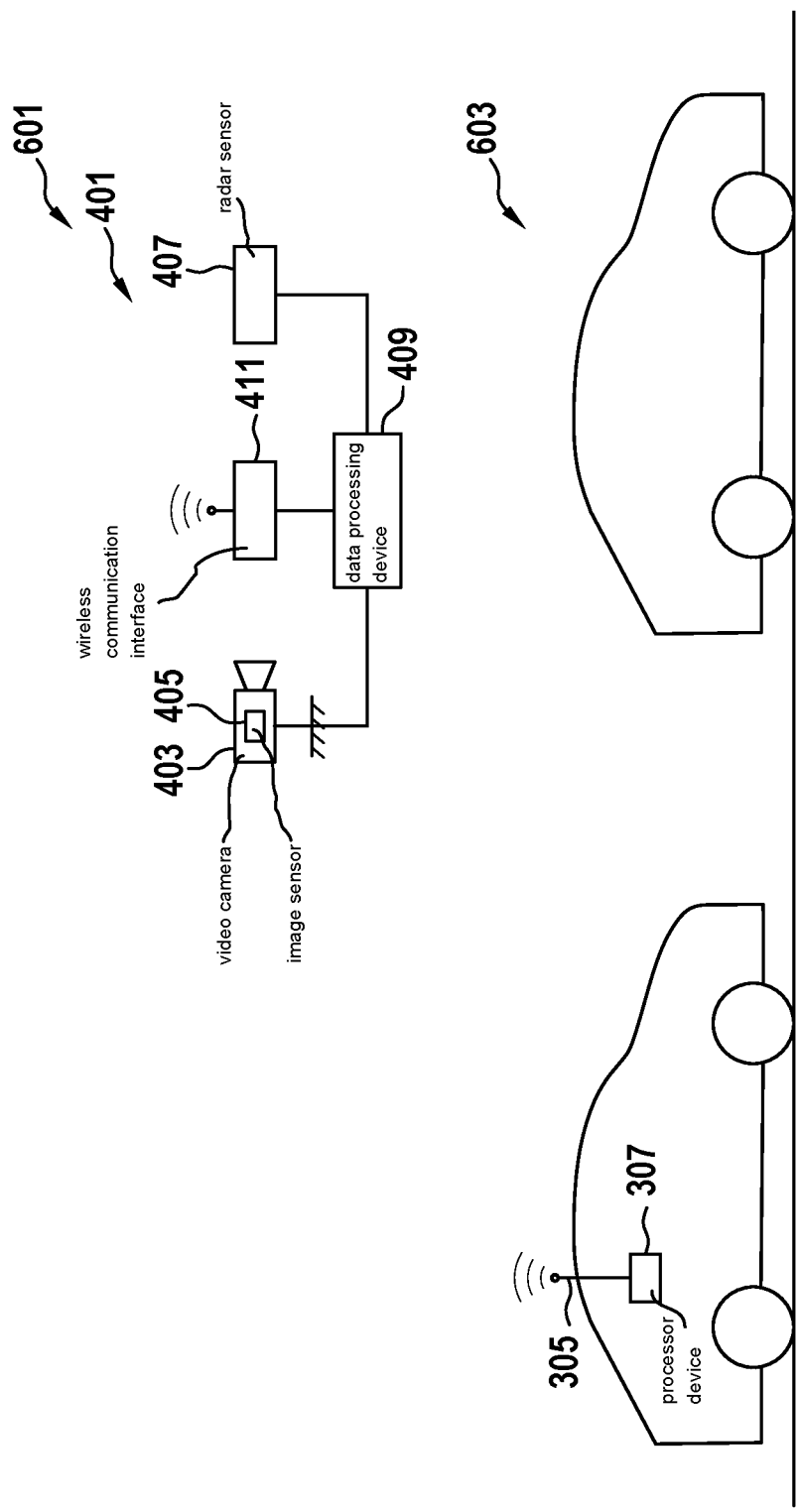
FIG. 6 shows an example parking lot according to an example embodiment of the present invention.

FIG. 6 shows a parking lot 601 as an example of an infrastructure within which the system 401 of FIG. 4 is implemented, which in this case is in particular an AVP system, and within which the motor vehicle 301 of FIG. 3 is located, which is, for example, an AVP motor vehicle, and within which a further motor vehicle 603 is located.

The motor vehicle 301 is to carry out an AVP process so that the motor vehicle 301 can also be referred to below as an AVP motor vehicle. Within the scope of the AVP process, it is necessary for the AVP motor vehicle to be identified and in particular located by the infrastructure, i.e., by the infrastructure-side AVP system 401. The infrastructure-side AVP system 401 thus has to know which of the two motor vehicles 301, 603 is the motor vehicle 301. This is advantageously made possible by the concept described here.

In particular, it is provided that the infrastructure-side AVP system 401 and the motor-vehicle-side system 300 agree, for example, on a common cryptographic key, as a common secret, using a key exchange method. This means that, by means of a key exchange method, the two systems 300 and 401 agree on a common cryptographic key that only the two of them know. Using a predetermined ascertainment rule, both entities, i.e., the infrastructure-side AVP system 401 and the motor-vehicle-side system 300, respectively ascertain a code on the basis of the agreed cryptographic key. Alternatively, the infrastructure-side AVP system 401 can send a random number as the common secret in encrypted form to the motor-vehicle-side system 300.

On the side of the infrastructure-side system 401, this ascertained code is referred to as the first code. The reason for this is in particular to terminologically distinguish the code ascertained on the infrastructure side from the code ascertained on the motor vehicle side, which code is transmitted by the signal emitted by the motor vehicle.

The signal emitted by the motor vehicle 301 thus transmits the code ascertained on the motor vehicle side, which code can be referred to as the second code.

That is to say, two codes are thus present on the infrastructure side, the first code, which was ascertained by the infrastructure-side AVP system 401, and the second code, which was ascertained by the motor-vehicle-side system 300.

For example, the signal emitted by the motor vehicle 301 can be an optical signal, which is or has been generated using one or more flashing lights of a driving direction indicator of the motor vehicle 301.

Even if the further motor vehicle 603 can, for example, eavesdrop on a communication between infrastructure-side AVP system 401 and motor-vehicle-side system 300, it still cannot generate the same code which is ascertained by the motor-vehicle-side system 300, since the further motor vehicle 603 does not know the common secret, the common cryptographic key, and also cannot easily calculate it from the eavesdropped communication.

Even if, in addition to the motor vehicle 301, the further motor vehicle 603 were to likewise emit optical signals, the infrastructure-side AVP system 401 will, however, identify the motor vehicle 301 as the one motor vehicle with the motor-vehicle-side system 300 of which the infrastructure-side AVP system 401 has agreed the common secret, on the basis of the second code, which is only transmitted by the optical signals of the motor vehicle 301.

After a positive identification, it is, for example, provided that the infrastructure-side AVP system 401 locates the motor vehicle 301 in the camera image on the basis of the detected position of the optical signals, i.e., the position of the signal source of the optical signals.

A necessary communication between infrastructure-side AVP system and motor-vehicle-side system can thus advantageously be standardized without having to dispense with safety aspects. Thus, for example, one or more V2X protocols can be used for the communication.

After a positive identification and after the infrastructure-side AVP system 401 has located the motor vehicle 301, the infrastructure-side AVP system 401 can guide the motor vehicle 301, for example according to AVP type-2, within the infrastructure. The motor vehicle 301 has, for example, one or more control devices (not shown), which convert control commands sent by the infrastructure-side AVP system 401.

When using a V2X protocol, it is provided that this communication no longer takes place in individually encrypted form (1:1 communication) between infrastructure (i.e., infrastructure-side AVP system) and an AVP motor vehicle (i.e., motor-vehicle-side AVP system). Instead, the communication is public and can be read by any subscriber.

In typical V2X applications, this is a reasonable procedure. For example, if each motor vehicle wants to transmit its current actual velocity and position to all other motor vehicles when driving on the freeway, this can be used for many functions (e.g. automatic braking if a traffic jam is impending, etc.). This type of communication is referred to as broadcast: a subscriber emits their information and all other subscribers read and possibly use the sent data. It is thus always a 1:n communication.

The concept described here provides, for example, that infrastructure and motor vehicle agree on a common secret, i.e., the infrastructure-side system and the motor-vehicle-side system, for example, agree on a common cryptographic key by means of a key exchange method. The Diffie-Hellman method can be used here, for example. The key exchange method can, for example, take place publicly without the eavesdropper being able to calculate the common secret.

The common secret, i.e., the common cryptographic key or the random number, is known only to the infrastructure and to the one motor vehicle. It can then, for example, be used to derive a flashing code, i.e., a code which is transmitted by an optical signal which is generated by a flashing light or by a plurality of flashing lights of a driving direction indicator.

This, for example, ensures that, in particular in the case of a plurality of motor vehicles, the one motor vehicle can be identified safely on the infrastructure side and can subsequently be located in particular on the infrastructure side.

Thus, for example, safe AVP operation is possible even if motor vehicles can eavesdrop on the communication between infrastructure and the one AVP motor vehicle to be controlled.

What is claimed is:

1. A method for controlling a motor vehicle, comprising the following steps:
   using a wireless communication interface of an infrastructure-side system of an infrastructure of a parking lot and a wireless communication interface of a motor-vehicle-side system of a first motor vehicle, communicating by the infrastructure-side system with the motor-vehicle-side system of the first motor vehicle, with which communication the infrastructure-side system agrees on a common secret with the motor-vehicle-side system;
   ascertaining a first code based on the common secret using a predetermined ascertainment rule by the infrastructure-side system;
   detecting, by the infrastructure-side system, light flashes emitted from a driving direction indicator of a motor vehicle lighting system, the emission occurring at a location that is within the parking lot and the detection being performed using an environmental sensor of or communicatively coupled to the infrastructure-side system;
   processing, by the infrastructure-side system, the light flashes to obtain a second code represented by the light flashes;
   comparing, by the infrastructure-side system, the second code to the first code to identify that the light flashes were emitted by the first motor vehicle with the motor-vehicle-side system of which the common secret had been agreed; and
   based on the identification, performing, by the infrastructure-side system, a wireless control communication with the motor-vehicle-side system via the wireless communication interfaces of the infrastructure-side system and the motor-vehicle-side system by which the infrastructure-side system remotely controls the first motor vehicle to perform an automated drive from a start position corresponding to the location at which the emission occurred to a target location of the parking lot.

2. The method according to claim 1, wherein the motor vehicle is an AVP vehicle, and the infrastructure-side system is an AVP system.

3. The method according to claim 1, wherein the agreeing on the common secret includes the infrastructure-side system sending the common secret in encrypted form to the motor-vehicle-side system, or the infrastructure-side system receiving the common secret in encrypted form from the motor-vehicle-side system.

4. The method according to claim 3, wherein a random number is ascertained as the common secret by the infrastructure-side system and is sent in encrypted form by the infrastructure-side system to the motor-vehicle-side system.

5. The method according to claim 1, wherein the common secret is agreed using a key exchange method so that the common secret is a common cryptographic key.

6. The method according to claim 5, wherein the common cryptographic key is agreed using a Diffie-Hellman (DH) method or an elliptic curve Diffie-Hellman (ECDH) method.

7. The method according to claim 1, wherein the common secret is agreed using a broadcast communication method including a V2X protocol.

8. The method according to claim 1, wherein the predetermined ascertainment rule is specified to the motor-vehicle-side system by the infrastructure-side system or is received by the infrastructure-side system from the motor-vehicle-side system.

9. The method according to claim 1, wherein the predetermined ascertainment rule is selected from the following group of ascertainment rules:
(i) ascertaining the first code by a hash function applied to the common secret;
(ii) using a group or a subset of bits from the common secret; and
(iii) using a hash value of the common secret.

10. A system for an infrastructure in a parking lot, the system configured to:
using a wireless communication interface of an infrastructure-side system of the infrastructure of the parking lot and a wireless communication interface of a motor-vehicle-side system of a first motor vehicle, communicate by the infrastructure-side system with the motor-vehicle-side system of the first motor vehicle, with which communication the infrastructure-side system agrees on a common secret with the motor-vehicle-side system;
ascertain a first code based on the common secret using a predetermined ascertainment rule by the infrastructure-side system;
detect, by the infrastructure-side system, light flashes emitted from a driving direction indicator of a motor vehicle lighting system, the emission occurring at a location that is within the parking lot and the detection being performed using an environmental sensor of or communicatively coupled to the infrastructure-side system;
process, by the infrastructure-side system, the light flashes to obtain a second code represented by the light flashes;
compare, by the infrastructure-side system, the second code to the first code to identify that the light flashes were emitted by the first motor vehicle with the motor-vehicle-side system of which the common secret had been agreed; and
based on the identification, perform, by the infrastructure-side system, a wireless control communication with the motor-vehicle-side system via the wireless communication interfaces of the infrastructure-side system and the motor-vehicle-side system by which the infrastructure-side system remotely controls the first motor vehicle to perform an automated drive from a start position corresponding to the location at which the emission occurred to a target location of the parking lot.

11. A method for a motor vehicle, comprising the following steps:
using a wireless communication interface of a motor-vehicle-side system of the motor vehicle and a wireless communication interface of an infrastructure-side system of an infrastructure including a parking lot, communicating by the motor-vehicle-side system with the infrastructure-side system, with which communication the motor-vehicle-side system agrees on a common secret with the infrastructure-side system;
ascertaining, using the motor-vehicle-side system, a first code based on the common secret using a predetermined ascertainment rule;
while the motor vehicle is at a location that is within the parking lot, operating a driving direction indicator of a lighting system of the motor vehicle, using the motor-vehicle-side system, to emit light flashes that signal the ascertained first code, wherein the infrastructure-side system with which the motor-vehicle-side system had communicated:
includes or is communicatively coupled to an environmental sensor with which the infrastructure-side system is configured to detect the light flashes when emitted in the parking lot; and
is configured to, based on the detection of the light flashes, generate control signals for an automated drive from a start position corresponding to the location to a target location of the parking lot;
receiving, by the motor-vehicle-side system and via the wireless communication interfaces of the infrastructure-side system and the motor-vehicle-side system, the generated control signals; and
controlling, by the motor-vehicle-side system, the motor vehicle to execute the automated drive to the target location of the parking lot.

12. A system of a motor vehicle, the system configured to:
using a wireless communication interface of a motor-vehicle-side system of the motor vehicle and a wireless communication interface of an infrastructure-side system of an infrastructure including a parking lot, communicate by the motor-vehicle-side system with the infrastructure-side system, with which communication the motor-vehicle-side system agrees on a common secret with the infrastructure-side system;
ascertain, using the motor-vehicle-side system, a first code based on the common secret using a predetermined ascertainment rule;
while the motor vehicle is at a location that is within the parking lot, operate a driving direction indicator of a lighting system of the motor vehicle, using the motor-vehicle-side system, to emit light flashes that signal the ascertained first code, wherein the infrastructure-side system with which the motor-vehicle-side system had communicated:
includes or is communicatively coupled to an environmental sensor with which the infrastructure-side system is configured to detect the light flashes when emitted in the parking lot; and
is configured to, based on the detection of the light flashes, generate control signals for an automated drive from a start position corresponding to the location to a target location of the parking lot;
receive, by the motor-vehicle-side system and via the wireless communication interfaces of the infrastructure-side system and the motor-vehicle-side system, the generated control signals; and
control, by the motor-vehicle-side system, the motor vehicle to execute the automated drive to the target location of the parking lot.

13. A motor vehicle comprising:
a motor-vehicle-side system configured to:
using a wireless communication interface of a motor-vehicle-side system of the motor vehicle and a wireless communication interface of an infrastructure-side system of an infrastructure including a parking lot, communicate by the motor-vehicle-side system with the infrastructure-side system, with which communication the motor-vehicle-side system agrees on a common secret with the infrastructure-side system;

ascertain, using the motor-vehicle-side system, a first code based on the common secret using a predetermined ascertainment rule, while the motor vehicle is at a location that is within the parking lot, operate a driving direction indicator of a lighting system of the motor vehicle, using the motor-vehicle-side system, to emit light flashes that signal the ascertained first code, wherein the infrastructure-side system with which the motor-vehicle-side system had communicated:

includes or is communicatively coupled to an environmental sensor with which the infrastructure-side system is configured to detect the light flashes when emitted in the parking lot; and is configured to, based on the detection of the light flashes, generate control signals for an automated drive from a start position corresponding to the location to a target location of the parking lot;

receive, by the motor-vehicle-side system and via the wireless communication interfaces of the infrastructure-side system and the motor-vehicle-side system, the generated control signals; and control, by the motor-vehicle-side system, the motor vehicle to execute the automated drive to the target location of the parking lot.

14. A non-transitory machine-readable storage medium on which is stored a computer program that is executable by a computer of an infrastructure-side system of an infrastructure of a parking lot and that, when executed by the computer, causes the computer to perform the following steps:

using a wireless communication interface of the infrastructure-side system and a wireless communication interface of a motor-vehicle-side system of a first motor vehicle, communicating by the infrastructure-side system with the motor-vehicle-side system of the first motor vehicle, with which communication the infrastructure-side system agrees on a common secret with the motor-vehicle-side system;

ascertaining a first code based on the common secret using a predetermined ascertainment rule by the infrastructure-side system;

detecting, by the infrastructure-side system, light flashes emitted from a driving direction indicator of a motor vehicle lighting system, the emission occurring at a location that is within the parking lot and the detection being performed using an environmental sensor of or communicatively coupled to the infrastructure-side system;

processing, by the infrastructure-side system, the light flashes to obtain a second code represented by the light flashes;

comparing, by the infrastructure-side system, the second code to the first code to identify that the light flashes were emitted by the first motor vehicle with the motor-vehicle-side system of which the common secret had been agreed; and based on the identification, performing, by the infrastructure-side system, a wireless control communication with the motor-vehicle-side system via the wireless communication interfaces of the infrastructure-side system and the motor-vehicle-side system by which the infrastructure-side system remotely controls the first motor vehicle to perform an automated drive from a start position corresponding to the location at which the emission occurred to a target location of the parking lot.

* * * * *